United States Patent
Li et al.

(10) Patent No.: US 12,188,198 B2
(45) Date of Patent: Jan. 7, 2025

(54) METHOD FOR CONSTRUCTING FIXED MONITORING PILE FOR MINING AREA WITH HIGH PHREATIC WATER LEVEL

(71) Applicants: PING AN COAL MINING ENGINEERING TECHNOLOGY RESEARCH INSTITUTE CO., LTD, Huainan (CN); HUAINAN MINING (GROUP) CO., LTD, Huainan (CN)

(72) Inventors: Hao Li, Huainan (CN); Shikai An, Huainan (CN); Biwu Han, Huainan (CN); Hongxing Guo, Huainan (CN); Yanfei Xu, Huainan (CN); Yunfei Yu, Huainan (CN); Qingfa Liao, Huainan (CN); Derong Zhao, Huainan (CN); Wei Miao, Huainan (CN)

(73) Assignees: PING AN COAL MINING ENGINEERING TECHNOLOGY RESEARCH INSTITUTE CO., LTD, Huainan (CN); HUAINAN MINING (GROUP) CO., LTD, Huainan (CN)

( * ) Notice: Subject to any disclaimer, the term of this patent is extended or adjusted under 35 U.S.C. 154(b) by 0 days.

(21) Appl. No.: 18/636,280

(22) Filed: Apr. 16, 2024

(65) Prior Publication Data
US 2024/0328108 A1 Oct. 3, 2024

Related U.S. Application Data

(63) Continuation of application No. PCT/CN2023/118133, filed on Sep. 12, 2023.

(30) Foreign Application Priority Data

Apr. 3, 2023 (CN) .......................... 202310364254.0

(51) Int. Cl.
*E02D 5/30* (2006.01)
*E02D 5/52* (2006.01)
(Continued)

(52) U.S. Cl.
CPC ................. *E02D 5/30* (2013.01); *E02D 5/52* (2013.01); *G01C 5/00* (2013.01); *E02D 17/02* (2013.01)

(58) Field of Classification Search
CPC .. E02D 5/30; E02D 5/52; E02D 17/02; G01C 5/00
See application file for complete search history.

(56) References Cited

U.S. PATENT DOCUMENTS

| | | | | | |
|---|---|---|---|---|---|
| 4,864,797 | A | * | 9/1989 | Sato | ........................... E04C 3/34 264/262 |
| 5,039,256 | A | * | 8/1991 | Gagliano | ................ E02D 27/16 405/244 |
| 2024/0337086 | A1 | * | 10/2024 | Han | ....................... E02D 27/525 |

FOREIGN PATENT DOCUMENTS

| CN | 107063177 A | 8/2017 |
|---|---|---|
| CN | 108867714 A | 11/2018 |

(Continued)

OTHER PUBLICATIONS

Code for Coal Pillar Retention and Coal Mining under Buildings, Water Bodies, Railways, and Main Mine Workings, Ministry of Emergency Management of the People's Republic of China; National Mine Safety Administration; National Energy Administration; National Railway Administration of the People's Republic of China, 2017, pp. 1-59.

*Primary Examiner* — Kyle Armstrong
(74) *Attorney, Agent, or Firm* — Bayramoglu Law Offices LLC

(57) ABSTRACT

A method for constructing a fixed monitoring pile for a mining area with a high phreatic water level includes: S1:
(Continued)

prefabricating a pile foundation body, where the pile foundation body has a columnar structure, and a plurality of extension connection ports are provided at an outer side and a bottom of the pile foundation body; and S2: digging a foundation pit at a designated monitoring point; combining the pile foundation body with an extension body to form a fixed monitoring pile; placing the fixed monitoring pile into the foundation pit, such that a bottom extension body and a side extension body are inserted into the pit foundation; and backfilling and compacting. The method increases the affinity between the fixed monitoring pile and a loose layer and strengthens the fixed monitoring pile to prevent it from loosening, thereby improving measurement accuracy.

9 Claims, 7 Drawing Sheets

(51) Int. Cl.
*G01C 5/00* (2006.01)
*E02D 17/02* (2006.01)

(56) References Cited

FOREIGN PATENT DOCUMENTS

| | | | |
|---|---|---|---|
| CN | 109059850 A | | 12/2018 |
| CN | 110359443 A | | 10/2019 |
| CN | 111637862 A | | 9/2020 |
| CN | 116242310 A | | 6/2023 |
| CN | 219416160 U | | 7/2023 |
| KR | 20120028598 A | * | 3/2012 |

* cited by examiner

METHOD FOR CONSTRUCTING FIXED MONITORING PILE FOR MINING AREA WITH HIGH PHREATIC WATER LEVEL

CROSS REFERENCE TO THE RELATED APPLICATIONS

This application is the continuation application of International Application No. PCT/CN2023/118133, filed on Sep. 12, 2023, which is based upon and claims priority to Chinese Patent Application No. 202310364254.0, filed on Apr. 3, 2023, the entire contents of which are incorporated herein by reference.

TECHNICAL FIELD

The present disclosure relates to a mining deformation monitoring method, and in particular to a method for constructing a fixed monitoring pile for a mining area with a high phreatic water level.

BACKGROUND

Coal has been the main energy source in China for a long time, and the development and utilization of coal resources have played a huge role in promoting the rapid development of the Chinese economy. However, the development and utilization of coal resources have also generated a series of safety and ecological issues, such as safety issues in coal mining under buildings, water bodies, and railways, and ecological and environmental issues such as ground subsidence and deformation, house collapse, and impounded surface water. These issues pose a huge threat to the lives and property of people and ecological environment in the mining area, and cause huge economic losses to coal enterprises. According to the "Code for Coal Pillar Retention and Coal Mining under Buildings, Water Bodies, Railways, and Main Mine Workings", on-site monitoring of surface movement and deformation should be carried out before mining in any mining area to provide technical support for coal pillar retention and coal mining in the mining area.

In order to accumulate data from surface observation stations for coal mining and analyze the laws of surface movement and deformation, fixed monitoring piles for coal mining surface deformation have been arranged in many mining areas in China, usually using point measurement methods such as leveling or global navigation satellite system (GNSS). Chinese patent application CN107063177A provides a simple monitoring pile for a surface subsidence monitoring point, including a straight rod body, a tip located at a lower part of the straight rod body, and an inner hole located at an upper part of the straight rod body.

In mining areas with a high phreatic water level, the phreatic water level varies seasonally. During the long dry period, due to a decrease in the affinity between the fixed monitoring pile and the surrounding loose layer, the loose layer around the fixed monitoring pile will crack. As a result, the fixed monitoring pile will shake, resulting in unreliable measurement results of the fixed monitoring pile. In view of this, it is highly desirable to develop a fixed monitoring pile and a pile construction method that conform to changes in the phreatic water level.

Information disclosed in this background section is provided merely for increasing the comprehension of the general background of the present disclosure, and shall not be regarded as acknowledgment or any form of suggestion that the information constitutes the prior art commonly known to those of ordinary skill in the art.

SUMMARY

The present disclosure aims to solve the following technical problem. In mining areas with a high phreatic water level, where the phreatic water level varies seasonally, due to the decrease in the affinity between the monitoring pile and the surrounding loose layer, the monitoring pile will shake, resulting in unreliable measurement results of the monitoring pile.

The present disclosure solves the above problem through the following technical solution.

A method for constructing a fixed monitoring pile for a mining area with a high phreatic water level includes:
- S1: prefabricating a pile foundation body, where the pile foundation body has a columnar structure, and a plurality of extension connection ports are provided at an outer side and a bottom of the pile foundation body; and
- S2: digging a foundation pit at a designated monitoring point; combining the pile foundation body with an extension body to form a fixed monitoring pile; placing the fixed monitoring pile into the foundation pit, such that a bottom extension body and a side extension body are inserted into the pit foundation; and backfilling and compacting.

In the present disclosure, a plurality of extension connection ports are formed on the sides of the pile foundation body and the ground. The extension connection ports are detachably connected to the plurality of extension bodies, forming an externally radiated fixed monitoring pile. On the one hand, the pile foundation body and the extension body are transported separately and assembled at the foundation pit to avoid transporting the entire fixed monitoring pile with a large volume, which is convenient for transportation and avoids additional transportation costs and difficulties. On the other hand, after the fixed monitoring pile is buried in the pit foundation, the side extension body and the bottom extension body extend out of the pile foundation body and enter the loose layer, increasing the contact area between the fixed monitoring pile and the loose layer. The design increases the affinity between fixed monitoring pile and the loose layer, and strengthens the fixed monitoring pile to prevent it from loosening, thereby improving measurement accuracy.

Preferably, in step S1, the pile foundation body includes the following components that are combined together through cement pouring: a plurality of steel reinforcement rings, a plurality of side connecting reinforcement bars, a central vertical reinforcement bar, and a plurality of spiral reinforcement tubes; the plurality of steel reinforcement rings are vertically spaced and connected by the plurality of side connecting reinforcement bars; the central vertical reinforcement bar is located at a center of the steel reinforcement ring; the plurality of spiral reinforcement tubes are distributed at the outer side of the pile foundation body; a bottom of the central vertical reinforcement bar is connected to a spiral reinforcement tube; and open ends of the spiral reinforcement tubes form the extension connection ports.

Preferably, in step S1, a production process of the pile foundation body includes:
- S11: prefabricating the plurality of steel reinforcement rings, the plurality of side connecting reinforcement bars, the central vertical reinforcement bar, the plurality of spiral reinforcement tubes, a measuring nail, a bottom wooden board, and side wooden boards;

S12: connecting the plurality of steel reinforcement rings to the plurality of side connecting reinforcement bars to form a cage structure; connecting the spiral reinforcement tube at a connection between the steel reinforcement ring and the side connecting reinforcement bar; placing the bottom wooden board at a bottom of the cage structure; and connecting the side wooden boards sequentially at sides of the cage structure;

S13: further connecting a top of the central vertical reinforcement bar to the measuring nail and the bottom of the central vertical reinforcement bar to the spiral reinforcement tube to form a combination; and connecting the combination to a center of the bottom wooden board; and S14: pouring cement mortar inside the bottom wooden board and the side wooden boards; and removing, after the cement mortar solidifies, the bottom wooden board and the side wooden boards.

Preferably, at least three steel reinforcement rings are arranged and are regular polygons with equally four or more sides; and sizes of the steel reinforcement rings increase in order, with a largest steel reinforcement ring located at a bottom of the foundation pit.

In the present disclosure, the cage structure is fully combined with cement to maintain the strength of the pile foundation body, and the bottom size of the pile foundation body is larger than the top size thereof, ensuring a lower center of gravity and improving stability.

Preferably, the bottom wooden board is a polygon; and the side wooden board is a rectangle or trapezoid.

Preferably, the side connecting reinforcement bar is at a 75-90° angle to a horizontal plane.

Preferably, the spiral reinforcement tube is a tubular structure with an internal thread; the extension body is a reinforcement bar with an end provided with an external thread; and the spiral reinforcement tube is connected in a threaded manner to the extension body.

In the present disclosure, the extension body is connected in a threaded manner to the pile foundation body, achieving convenient disassembly and reliable connection.

Preferably, the cement mortar includes a combination of cement, yellow sand, and gravel that are mixed in a ratio of 1:(1.5-2.5):(1.5-2.5) and are stirred into a fluid by water.

Preferably, in step S2, a distance between designated monitoring points is 40-50 m.

Preferably, step S2 further includes: connecting the extension body to the extension ports of the pile foundation body; placing the extension body and the pile foundation body into the foundation pit; placing the side extension body according to an inherent hole of the foundation pit, and fully extending an exposed section of the bottom extension body into a loose layer; constantly backfilling original soil outside the fixed monitoring pile; and making the soil around the fixed monitoring pile level with a ground surface through watering, compacting, or other means.

The present disclosure has following advantages:

(1) In the present disclosure, a plurality of extension connection ports are formed on the sides of the pile foundation body and the ground. The extension connection ports are detachably connected to the plurality of extension bodies, forming an externally radiated fixed monitoring pile. On the one hand, the pile foundation body and the extension body are transported separately and assembled at the foundation pit to avoid transporting the entire fixed monitoring pile with a large volume, which is convenient for transportation and avoids additional transportation costs and difficulties. On the other hand, after the fixed monitoring pile is buried in the pit foundation, the side extension body and the bottom extension body extend out of the pile foundation body and enter the loose layer, increasing the contact area between the fixed monitoring pile and the loose layer. The design increases the affinity between fixed monitoring pile and the loose layer, and strengthens the fixed monitoring pile to prevent it from loosening, thereby improving measurement accuracy.

(2) In the present disclosure, the cage structure is fully combined with cement to maintain the strength of the pile foundation body, and the bottom size of the pile foundation body is larger than the top size thereof, ensuring a lower center of gravity and improving stability.

(3) In the present disclosure, the extension body is connected in a threaded manner to the pile foundation body, achieving convenient disassembly and reliable connection.

Figure 1:
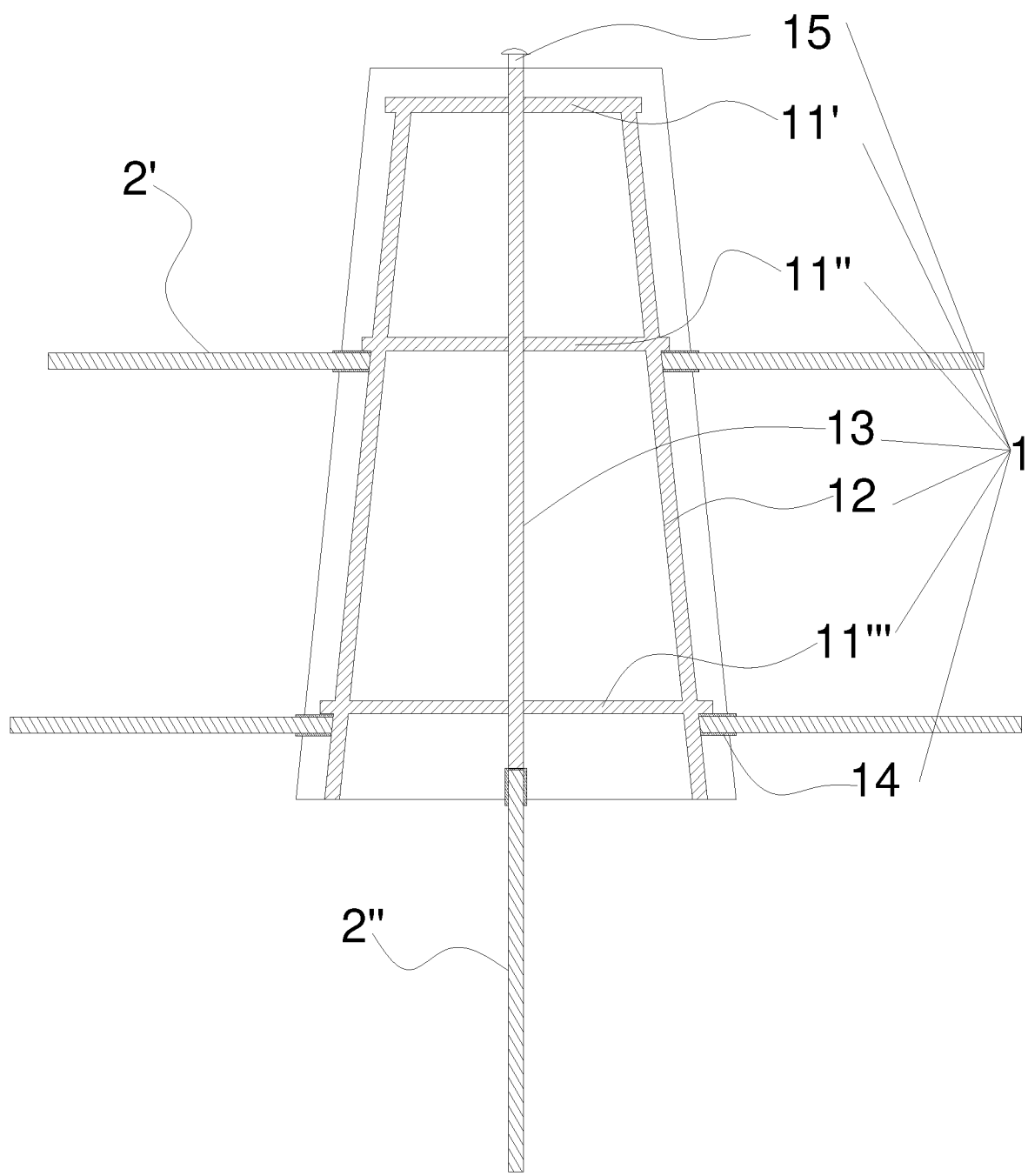
FIG. 1 is a structural diagram of a pile foundation body according to Embodiment 1 of the present disclosure.

REFERENCE NUMERALS 1. pile foundation body; 11. steel reinforcement ring; 12. side connecting reinforcement bar; 13. central vertical reinforcement bar; 14. spiral reinforcement tube; 15. measuring nail; 16. bottom wooden board; and 17. side wooden board; and 2. extension body.

DETAILED DESCRIPTION OF THE EMBODIMENTS

In order to make the objectives, technical solutions, and advantages of embodiments of the present disclosure clearer, the following clearly and completely describes the technical solutions in the embodiments of the present disclosure with reference to the embodiments of the present disclosure. Apparently, the described embodiments are some rather than all of the embodiments. All other embodiments obtained by those of ordinary skill in the art based on the embodiments of the present disclosure without creative efforts should fall within the protection scope of the present disclosure.

Embodiment 1

Figure 2:
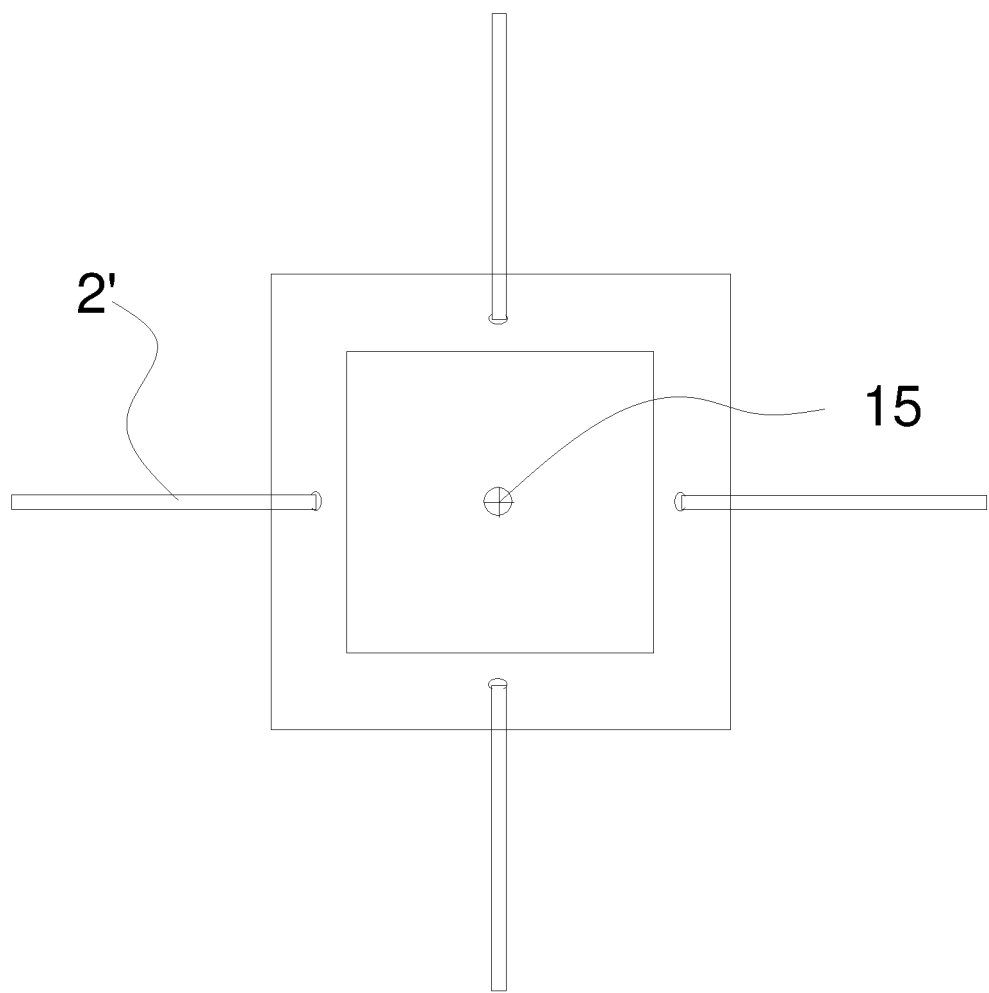
FIG. 2 is a top view of the pile foundation body according to Embodiment 1 of the present disclosure.
Figure 3:
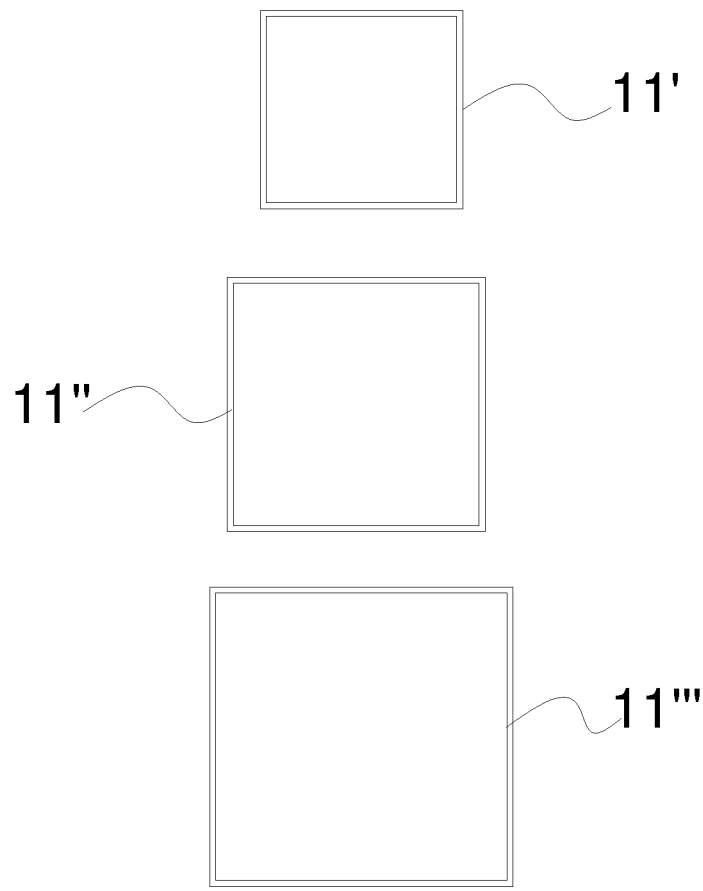
FIG. 3 is a structural diagram of steel reinforcement rings according to Embodiment 1 of the present disclosure.
Figure 4:
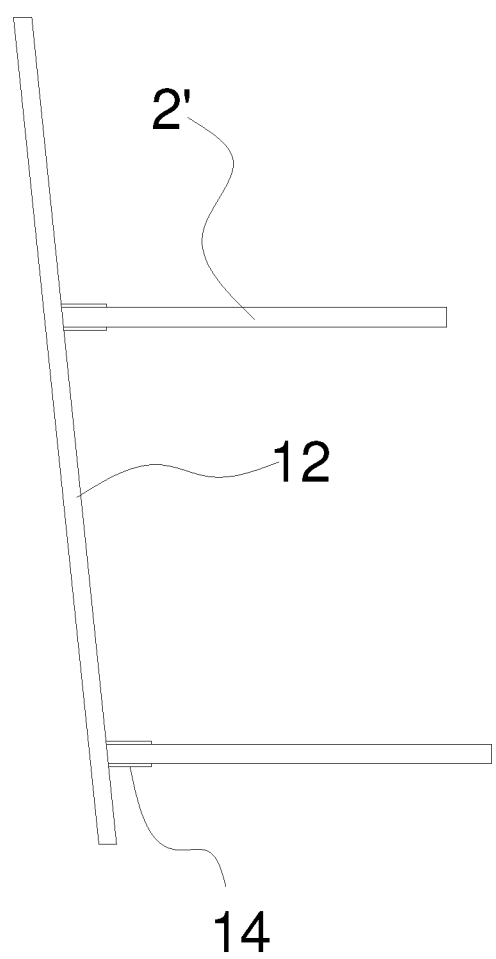
FIG. 4 is a structural diagram of a combination of a side connecting reinforcement bar, spiral reinforcement tubes, and extension bodies according to Embodiment 1 of the present disclosure.
Figure 5:
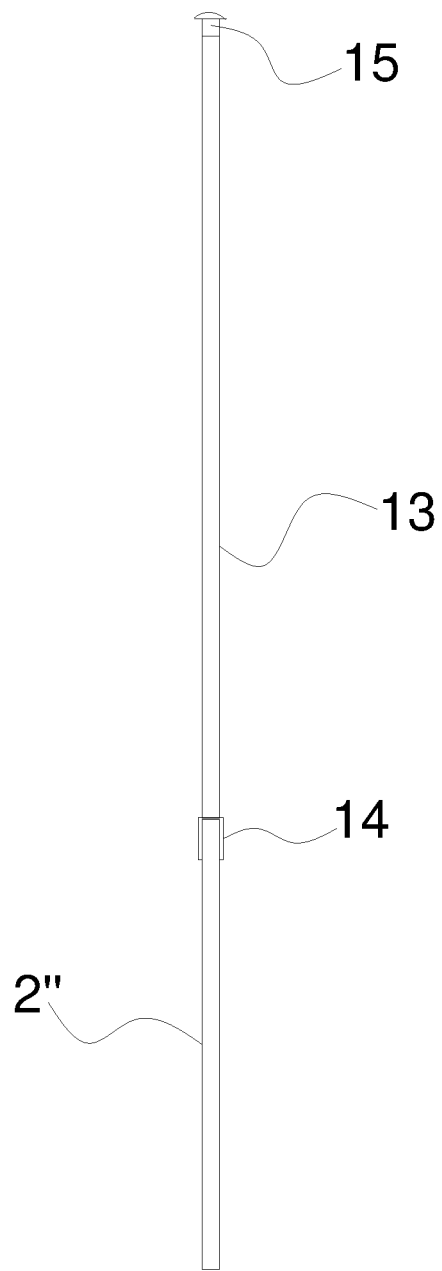
FIG. 5 is a structural diagram of a combination of a central vertical reinforcement bar, a measuring nail, a spiral reinforcement tube, and an extension body according to Embodiment 1 of the present disclosure.
Figure 6:
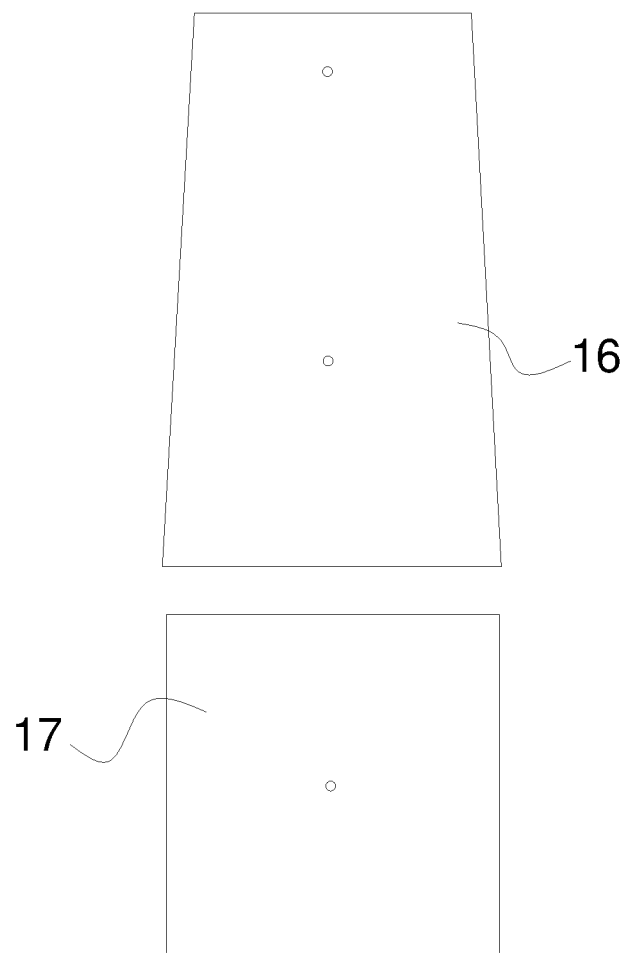
FIG. 6 is a structural diagram of a side wooden board and a bottom wooden board according to Embodiment 1 of the present disclosure.

As shown in FIGS. 1, 2, and 3, a method for constructing a fixed monitoring pile for a mining area with a high phreatic water level includes the following steps.

S1. Pile foundation body 1 is prefabricated. The pile foundation body 1 has a columnar structure, and a plurality of extension connection ports are provided at an outer side and a bottom of the pile foundation body 1.

The pile foundation body 1 includes the following components that are combined together through cement pouring: a plurality of steel reinforcement rings 11, a plurality of side connecting reinforcement bars 12, central vertical reinforcement bar 13, and a plurality of spiral reinforcement tubes 14.

In this embodiment, there are three steel reinforcement rings 11. The three steel reinforcement rings 11 are regular polygons with four or more sides. This embodiment illustrates quadrilateral steel reinforcement rings. The sizes of the three steel reinforcement rings 11 increase in order from top to bottom, with the largest steel reinforcement ring 11 located at a bottom of a foundation pit. The three steel reinforcement rings 11 are vertically spaced and connected by the plurality of side connecting reinforcement bars 12. The central vertical reinforcement bar 13 is located at a center of the steel reinforcement ring 11. The plurality of spiral reinforcement tubes 14 are distributed at the outer side of the pile foundation body 1, and open ends of the spiral reinforcement tubes 14 form the extension connection ports.

In this embodiment, a specific production process of the pile foundation body 1 is as follows.

S11. The plurality of steel reinforcement rings 11, the plurality of side connecting reinforcement bars 12, the central vertical reinforcement bar 13, the plurality of spiral reinforcement tubes 14, measuring nail 15, bottom wooden board 16, and side wooden boards 17 are prefabricated.

The steel reinforcement rings 11 of three specifications each can be formed by bending and connecting an entire reinforcement bar or by welding a plurality of reinforcement bars. The dimensions of top steel reinforcement ring 11' are: La=0.36 m, and φ=20 mm, and the dimensions of middle steel reinforcement ring 11' are: Lb=0.41 m, and φ=20 mm. The dimensions of bottom steel reinforcement ring 11''' are: Lc=0.56 m, and φ=20 mm. The dimensions of the side connecting reinforcement bar 12 are: L=1.0 m, and φ=20 mm. The dimension of the spiral reinforcement tube 14 is L=0.05 m, and the spiral reinforcement tube is provided therein with a spiral opening. A side number of the steel reinforcement ring 11 is equal to a side number of the side connecting reinforcement bar 12.

The dimensions of the central vertical reinforcement bar 13 are: L=1.0 m, and φ=20 mm. An upper part of measuring nail 15 is provided with a cross nut, φ=20 mm. The measuring nail is connected to a top of the central vertical reinforcement bar 13. A bottom of the central vertical reinforcement bar 13 is connected to a spiral reinforcement tube 14. More specifically, the top of the central vertical reinforcement bar 13 is welded to the measuring nail 15, and the bottom thereof is welded to a vertical spiral reinforcement tube 14. A total length of a combination of the central vertical reinforcement bar 13, the top measuring nail 15, and the bottom spiral reinforcement tube 14 is greater than a length of the pile foundation body 1, and the top measuring nail 15 is precisely located at a top protruding position of the pile foundation body 1.

The bottom wooden board 16 is a polygon and is compatible with the bottom steel reinforcement ring 11''. The dimensions of the bottom wooden board 16 are: L (side)=0.6 m, and φ(hole)=20 mm. The side wooden board 17 is a trapezoidal board. Therefore, the dimensions of the side wooden board 17 are: L (long base)=0.6 m, L (short base)=0.4 m, and φ(hole)=20 mm. The long base of the side wooden board 17 is 4 cm longer than the side of the bottom steel reinforcement ring 11'', and the short base of the side wooden board 17 is 4 cm longer than the side of the top steel reinforcement ring 11''.

The side wooden board 17 is provided with two holes corresponding to the lateral spiral reinforcement tube 14, and a diameter of the holes is equal to a diameter of the lateral spiral reinforcement tube 14. The bottom wooden board 16 is provided with a hole corresponding to the vertical spiral reinforcement tube 14 at the bottom of the central vertical reinforcement bar 13. The hole of the bottom wooden board 16 is located at a center of the regular polygon, and has a diameter equal to a diameter of the vertical spiral reinforcement tube 14.

The length of the long base of the side wooden board 17 is equal to the side length of the bottom wooden board 16, and the number of the side wooden boards 17 is equal to the side number of the bottom wooden board 16.

S12. The plurality of steel reinforcement rings 11 are connected to the plurality of side connecting reinforcement bars 12 to form a cage structure. The spiral reinforcement tube 14 is connected at a connection between the steel reinforcement ring 11 and the side connecting reinforcement bar 12. The bottom wooden board 16 is provided at a bottom of the cage structure, and the side wooden boards 17 are sequentially connected at sides of the cage structure.

Specifically, the side connecting reinforcement bar 12 is inclined, and the side connecting reinforcement bar 12 is at a 75-90° angle, preferably an 85° angle, to a horizontal plane. After the side connecting reinforcement bar 12 is inclined, the lateral spiral reinforcement tubes 14 are welded horizontally to the middle and bottom of the side connecting reinforcement bars 12. In this embodiment, the side connecting reinforcement bar 12 is 1.0 m long. The spiral reinforcement tubes 14 are respectively welded at a fixed position that is 0.05 m far from the bottom of the side connecting reinforcement bar 12 and a position that is 0.1 m far from the middle of the side connecting reinforcement bar.

The bottom steel reinforcement ring 11''' is tied to the spiral reinforcement tube 14 at the 0.05 m fixed position with an iron wire or other tying wires. The bottom steel reinforcement ring 11''' is located above the spiral reinforcement tube 14. The position where the bottom steel reinforcement ring 11''' is tied is in the middle of each side.

The central steel reinforcement ring 11'' is tied to the spiral reinforcement tube 14 at the 0.1 middle position with an iron wire or other tying wires. The central steel reinforcement ring 11'' is located above the spiral reinforcement tube 14. The position where the bottom steel reinforcement ring 11''' is tied is in the middle of each side.

The top steel reinforcement ring 11' is tied to the top of the side connecting reinforcement bar 12 with an iron wire or other tying wires. The position where the top steel reinforcement ring 11' is tied is in the middle of each side.

S13. The top of the central vertical reinforcement bar is connected to the measuring nail 15, and the bottom of the central vertical reinforcement bar is connected to the spiral reinforcement tube to form a combination, and the combination is connected to the center of the bottom wooden board 16.

Specifically, on a site where the pile foundation body 1 is prefabricated, the bottom wooden board 16 is placed in order, and a combination of the central vertical reinforcement bar 13, the measuring nail 15, and the vertical spiral reinforcement tube 14 is placed on the bottom wooden board 16. The vertical spiral reinforcement tube 14 is placed on the bottom wooden board 16 and corresponds to the hole of the bottom wooden board 16. A combination of the side connecting reinforcement bars 12, the three steel reinforcement rings 11, and the lateral spiral reinforcement tubes 14, as well as the side wooden board 17, are placed in order on the sides of the bottom wooden board. The lateral spiral reinforcement tubes 14 are placed on inner sides of the side wooden board 17 and correspond to the holes of the side wooden board 17. The side wooden board 17 is tied in fixed order, and the bottom of the side wooden board 17 is combined with the side boundaries of the bottom wooden board 16.

S14. Cement mortar is poured inside the bottom wooden board 16 and the side wooden boards 17. After the cement mortar solidifies, the bottom wooden board 16 and the side wooden boards 17 are removed.

Specifically, the cement mortar includes a combination of cement, yellow sand, and gravel that are mixed in a ratio of 1:2:2 and are stirred into a fluid by water.

After the cement mortar inside the prefabricated wooden template solidifies, the side wooden boards 17 and the bottom wooden board 16 are removed to form the pile foundation body 1.

In this embodiment, the pile foundation body 1 is 1 m high, with a top side length of 0.36 m and a bottom side length of 0.6 m.

S2. The foundation pit is dug at a designated monitoring point. The pile foundation body 1 is combined with extension body 2 to form a fixed monitoring pile. The fixed monitoring pile is placed into the foundation pit, and bottom extension body 2' and side extension body 2' are inserted into the pit foundation. Then backfilling and compaction operations are conducted.

The bottom extension body 2' and the side extension body 2' are threaded and are connected in a threaded manner to the bottom vertical spiral reinforcement tube 14 and the lateral spiral reinforcement tube 14.

In this embodiment, the dimensions of the side extension body 2" are: L=0.45 m, and φ=20 mm, and one side of the side extension is threaded. The dimensions of the bottom extension body 2' are: L=0.5 m, and φ=20 mm, and a top of the bottom extension is threaded.

In this embodiment, the extension body 2 is a straight rod made of a reinforcement bar. Of course, the extension body 2 can also be curved, such as wavy and hooked, to further improve the bonding strength between the extension body and soil.

At the designated monitoring point, known fixed points (undisturbed points) are found at upper and lower positions of a working face in a mining area according to drawings. Observation lines are set up along the strike and inclination of the working face, and the fixed points are set up along the observation lines. At the undisturbed points, a disturbance range of the working face is calculated using a probability integration method before mining. The undisturbed points should be located outside the disturbance range, and the plurality of fixed points should be set up outside each disturbance range to prevent human influence.

A distance between designated monitoring points is appropriately 45 m, and the monitoring points should be densified at the mining boundary of the working face. In addition, they should avoid unsuitable locations such as ponds and temporary spoil banks.

A pit foundation with corresponding depth and width (H=1 m, L (bottom)=1.4 m) is dug according to the size of a steel reinforcement mold.

The pile foundation body 1 is hoisted through a crane or other means. The bottom extension body 2' is rotated into the vertical spiral reinforcement tube 14, while the side extension body 2' is rotated into the lateral spiral reinforcement tube 14.

The prefabricated fixed monitoring pile is transported to the designated monitoring point using a crane, and trucks and cranes can be used along the way.

The fixed monitoring pile is placed into the foundation pit through a crane or other means. The side extension body 2' is placed according to the opening of the foundation pit, and an exposed section of the bottom extension body 2' fully extends into a loose layer. The original soil is backfilled outside the fixed monitoring pile. The soil outside the monitoring pile is compacted by stones, and water is sprinkled to the upper part of the soil, allowing water to seep into the bottom of the soil to make it compact. Then the upper part of the compacted soil is further covered with soil, and the soil is compacted.

In this embodiment, a plurality of extension connection ports are formed on the sides of the pile foundation body 1 and the ground. The extension connection ports are detachably connected to the plurality of extension bodies 2, forming an externally radiated fixed monitoring pile. On the one hand, the pile foundation body 1 and the extension body 2 are transported separately and assembled in the proximity of the foundation pit or a pre-assembly point to avoid transporting the entire fixed monitoring pile with a large volume, which is convenient for transportation and avoids additional transportation costs and difficulties. On the other hand, after the fixed monitoring pile is buried in the pit foundation, the side extension body 2 and the bottom extension body 2' extend out of the pile foundation body 1 and enter the loose layer, increasing the contact area between the fixed monitoring pile and the loose layer. The design increases the affinity between fixed monitoring pile and the loose layer, and strengthens the fixed monitoring pile to prevent it from loosening, thereby improving measurement accuracy.

Embodiment 2

Figure 7:
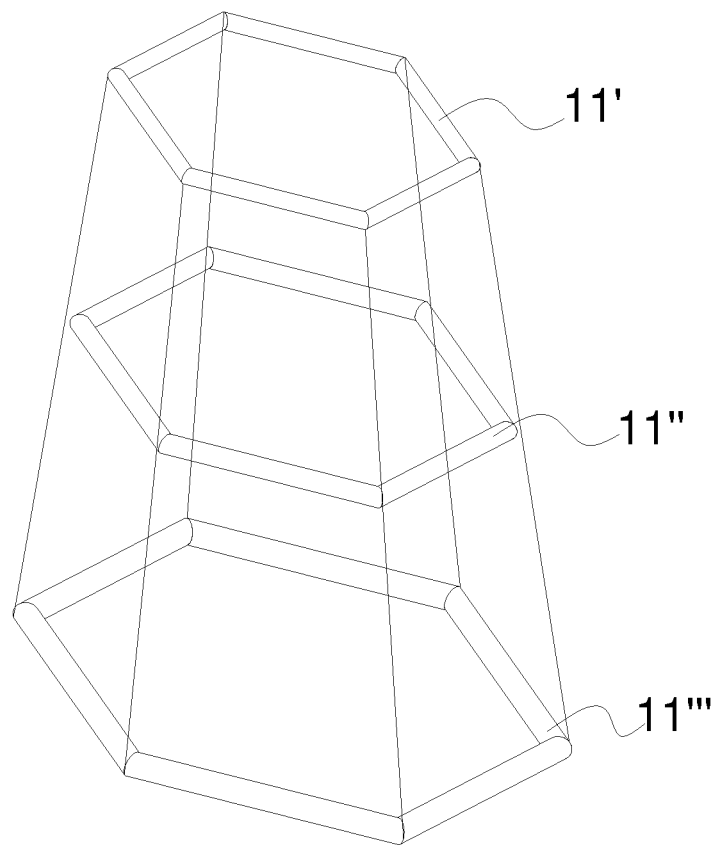
FIG. 7 is a structural diagram of steel reinforcement rings according to Embodiment 2 of the present disclosure.

As shown in FIG. 7, this embodiment differs from Embodiment 1 in the side number of the steel reinforcement ring 11.

In this embodiment, three steel reinforcement rings 11 each include six sides. In addition, the fixed monitoring pile includes side connecting reinforcement bars 12, twelve lateral spiral reinforcement tubes 14, six side wooden boards 17, and twelve extension bodies 2' located on the sides of side extension body 2. This embodiment increases the side number of the steel reinforcement ring 11, and adaptively increases the number of the side extension bodies 2', improving the bonding force between the fixed monitoring pile and the soil.

The foregoing embodiments are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or perform equivalent substitutions on some technical features therein. These modifications or substitutions do not make the essence of the corresponding technical solutions deviate from the spirit and scope of the technical solutions of the embodiments of the present disclosure.

The invention claimed is:

1. A method for constructing a fixed monitoring pile for a mining area with a high phreatic water level, comprising:

S1: prefabricating a pile foundation body, wherein the pile foundation body has a columnar structure, and a plurality of extension connection ports are provided at an outer side and a bottom of the pile foundation body; and S2: digging a foundation pit at a designated monitoring point; combining the pile foundation body with an extension body to form a fixed monitoring pile; placing the fixed monitoring pile into the foundation pit, such that a bottom extension body and a side extension body are inserted into the pit foundation; and backfilling and compacting;

wherein in step S1, the pile foundation body comprises the following components that are combined together through cement pouring: a plurality of steel reinforcement rings, a plurality of side connecting reinforcement bars, a central vertical reinforcement bar, and a plurality of spiral reinforcement tubes; the plurality of steel reinforcement rings are vertically spaced and connected by the plurality of side connecting reinforcement bars; the central vertical reinforcement bar is located at a center of the steel reinforcement ring; the plurality of spiral reinforcement tubes are distributed at the outer side of the pile foundation body; a bottom of the central vertical reinforcement bar is connected to a spiral reinforcement tube; and open ends of the spiral reinforcement tubes form the extension connection ports.

2. The method for constructing the fixed monitoring pile for the mining area with the high phreatic water level according to claim 1, wherein in step S1, a production process of the pile foundation body comprises:

S11: prefabricating the plurality of steel reinforcement rings, the plurality of side connecting reinforcement bars, the central vertical reinforcement bar, the plurality of spiral reinforcement tubes, a measuring nail, a bottom wooden board, and side wooden boards;

S12: connecting the plurality of steel reinforcement rings to the plurality of side connecting reinforcement bars to form a cage structure; connecting the spiral reinforcement tube at a connection between the steel reinforcement ring and the side connecting reinforcement bar; placing the bottom wooden board at a bottom of the cage structure; and connecting the side wooden boards sequentially at sides of the cage structure;

S13: further connecting a top of the central vertical reinforcement bar to the measuring nail and the bottom of the central vertical reinforcement bar to the spiral reinforcement tube to form a combination; and connecting the combination to a center of the bottom wooden board; and S14: pouring cement mortar inside the bottom wooden board and the side wooden boards; and removing, after the cement mortar solidifies, the bottom wooden board and the side wooden boards.

3. The method for constructing the fixed monitoring pile for the mining area with the high phreatic water level according to claim 2, wherein at least three steel reinforcement rings are arranged and are regular polygons with equally four or more sides; and sizes of the steel reinforcement rings increase in order, with a largest steel reinforcement ring located at a bottom of the foundation pit.

4. The method for constructing the fixed monitoring pile for the mining area with the high phreatic water level according to claim 2, wherein the bottom wooden board is a polygon; and each of the side wooden boards is a rectangle or trapezoid.

5. The method for constructing the fixed monitoring pile for the mining area with the high phreatic water level according to claim 2, wherein each of the plurality of side connecting reinforcement bars is at a 75-90° angle to a horizontal plane.

6. The method for constructing the fixed monitoring pile for the mining area with the high phreatic water level according to claim 2, wherein each of the plurality of spiral reinforcement tubes is a tubular structure with an internal thread; the extension body is a reinforcement bar with an end provided with an external thread; and each of the plurality of spiral reinforcement tubes is connected in a threaded manner to the extension body.

7. The method for constructing the fixed monitoring pile for the mining area with the high phreatic water level according to claim 2, wherein the cement mortar comprises a combination of cement, yellow sand, and gravel, wherein the cement, the yellow sand, and the gravel are mixed in a ratio of 1:(1.5-2.5):(1.5-2.5) and are stirred into a fluid by water.

8. The method for constructing the fixed monitoring pile for the mining area with the high phreatic water level according to claim 1, wherein in step S2, a distance between designated monitoring points is 40-50 m.

9. The method for constructing the fixed monitoring pile for the mining area with the high phreatic water level according to claim 1, wherein step S2 further comprises: connecting the extension body to the extension ports of the pile foundation body; placing the extension body and the pile foundation body into the foundation pit; placing the side extension body according to an inherent hole of the foundation pit, and fully extending an exposed section of the bottom extension body into a loose layer, constantly backfilling original soil outside the fixed monitoring pile; and making the soil around the fixed monitoring pile level with a ground surface through watering, compacting, or other means.

* * * * *